June 26, 1962     H. M. McCLELLAND     3,040,445
SYNCHRONIZED SONAR TRAINER

Filed Sept. 27, 1960     2 Sheets-Sheet 1

INVENTOR.
HAROLD M. McCLELLAND
BY
*ATTORNEYS*

June 26, 1962     H. M. McCLELLAND     3,040,445
SYNCHRONIZED SONAR TRAINER

Filed Sept. 27, 1960     2 Sheets-Sheet 2

INVENTOR.
HAROLD M. McCLELLAND
BY
ATTORNEYS

United States Patent Office 3,040,445
Patented June 26, 1962

3,040,445
SYNCHRONIZED SONAR TRAINER
Harold M. McClelland, San Diego, Calif., assignor to the United States of America as represented by the Secretary of the Navy
Filed Sept. 27, 1960, Ser. No. 58,856
12 Claims. (Cl. 35—10.4)
(Granted under Title 35, U.S. Code (1952), sec. 266)

The invention described herein may be manufactured and used by or for the Government of the United States of America for governmental purposes without the payment of any royalties thereon or therefor.

The present invention relates generally to devices for training sonar and radar operators and in particular to an improved sonar training instrument utilizing an electronic keying circuit for synchronizing subsequently recreated sonar displays with prior received and recorded sonar data.

In the past, it has been found to be satisfactory in many instances to make magnetic recordings of sonar receiver sound output signals which may be reproduced aurally at will. Of course, such a system only provided ear-training for the sonar operator. In event it was desired to employ other readout means such as, for example, a visual display means as a concomitant to said aural reproduction, it was found to be necessary to mark the recording tape at the various locations representing the start of each sonar transmission. Actually, said locations were represented by an absence of signals, since the sonar receiver was blanked out during the transmission period. By splicing short sections of magnetic tape on which a signal of predetermined amplitude and frequency had been recorded into the original magnetic tape recording at the aforesaid locations represented by an absence of signals, the synchronizing trigger signal necessary for timely actuating training readout equipment is effected and the resulting tape may be used as the training tape. But, this procedure requires time and skilled labor to make the final tape product sufficiently useful to be worthwhile.

The present invention overcomes these disadvantages in that a training tape incorporating any desired synchronizing signals necessary for the timely actuation of appropriate training readout equipment may be automatically made from the tape recording of the originally received sonar signals. And, moreover, since this is done automatically by the subject device, neither skilled labor or elaborate and expensive processing equipment is required.

It is, therefore, an object of this invention to provide means for synchronizing time intervals of echo-ranging signals to timely recreate original displays thereof.

Another object of this invention is to provide means for facilitating the training of sonar and radar operators.

A further object of this invention is to provide simultaneous aural and visual displays of received echo-ranging signals at a preferred time subsequent to the initial reception thereof.

Another object of this invention is to provide means for automatically making magnetic tape recordings for correlating the echo-ranging signals of sonar and radar sets with training display equipment.

Still another object of this invention is to provide improved means facilitating the inspection and evaluation of echo-ranging data by highly trained evaluation experts located at a position remote from the initial field reception position thereof.

A further object of this invention is to provide improved means for reducing the time required to produce helicopter sonar training programs.

Another object of this invention is to provide correlated sweep trigger signals which may be used to start or initiate a new range recorder trace, change frames on a strip film projector, or trigger the sweep trigger circuit of scan-type sonar and radar sets.

Another object of this invention is to provide an electronic keyer using the blanking or silent time of echo-ranging devices as a means for triggering subsequently recreated visual displays or other appropriate utilization and readout equipment.

Other objects and many of the attendant advantages of this invention will be readily appreciated as the same becomes better understood by reference to the following detailed description when considered in conjunction with the accompanying drawings wherein.

Figure 1:
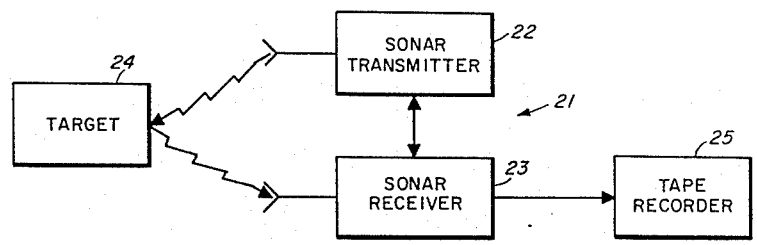
FIG. 1 shows a block diagram of a conventional sonar system combined with a tape recorder type readout means.

Referring now to the drawings, there is shown in FIG. 1 a sonar set 21 containing a sonar transmitter 22 adapted for broadcasting acoustical energy and a sonar receiver 23 adapted to receive said broadcast acoustical energy after it has been reflected by a target 24. A magnetic tap recorder 25 is connected to the output of said sonar receiver for recording the aforesaid received acoustical signals.

Figure 2:
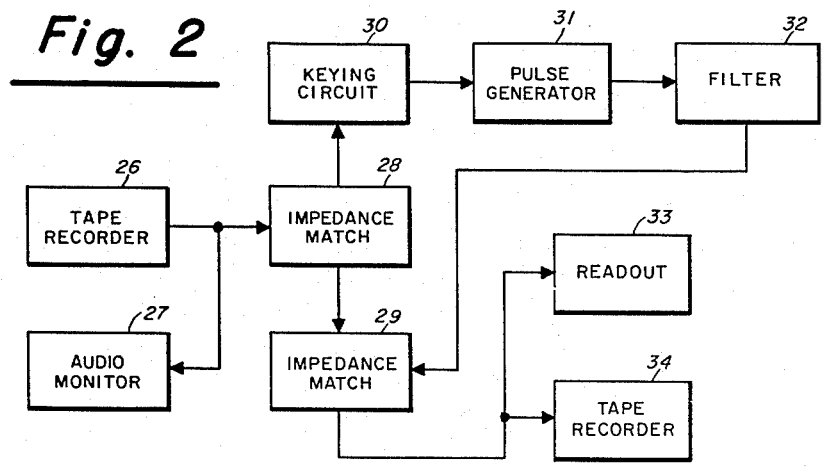
FIG. 2 depicts a block diagram of a preferred embodiment of the system constituting the invention.

FIG. 2 depicts a preferred embodiment of the invention that includes a tape recorder 26 which is adapted to play back the sonar signals recorded by tape recorder 25. Although in this instance, in order to provide a separate and distinct unitary device, tape recorder 26 is shown as being another tape recorder, but if circumstances so warrant, tape recorder 25 may be used in lieu thereof. The output of tape recorder 26 is applied to an audio monitor 27 and to a three-way impedance match 28, from which it is fed as inputs to another three-way impedance match 29 and to a keying circuit 30. The output of keying circuit 30 triggers a pulse generator 31 which, in turn, produces a predetermined frequency signal such as, for example, a seventy-five cycle per second signal, adapted for actuating complementary associated sonar trainer equipment. To insure the purity of this signal, it may be appropriately filtered by a filter 32 if so desired. On the other hand, if close regulation of the frequency is not necessary for the proper actuation of said associated equipment, said filter may be omitted from the subject system. In either event, the output signal of pulse generator 31 is passed on as one of the inputs to the aforesaid three-way impedance match 29. The output signal of impedance match 29 is applied to a utilization and readout means 33 for further use and display and to another tape recorder 34 for recording.

Figure 3:
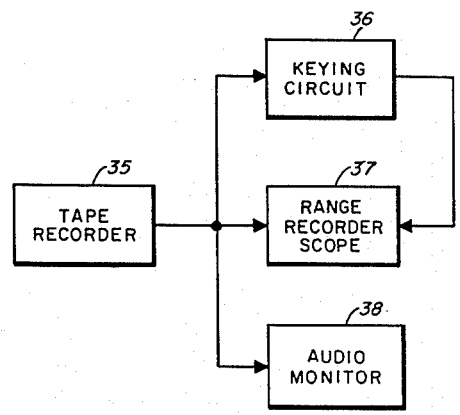
FIG. 3 illustrates a block diagram of a simplified embodiment of the subject invention incorporating a range recorder as a visual readout means.

FIG. 3 illustrates a simplified version of the subject invention as having a magnetic tape recorder 35 substantially similar to all of the aforementioned tape recorders and adapted to playback the recorded tapes thereof. The output of said tape recorder is simultaneously fed to a keying circuit 36, a utilization and display means such as range recorder and scope 37, and an audio monitor 38. The output of keying circuit 36 is applied as another input to range recorder 37.

Figure 4:
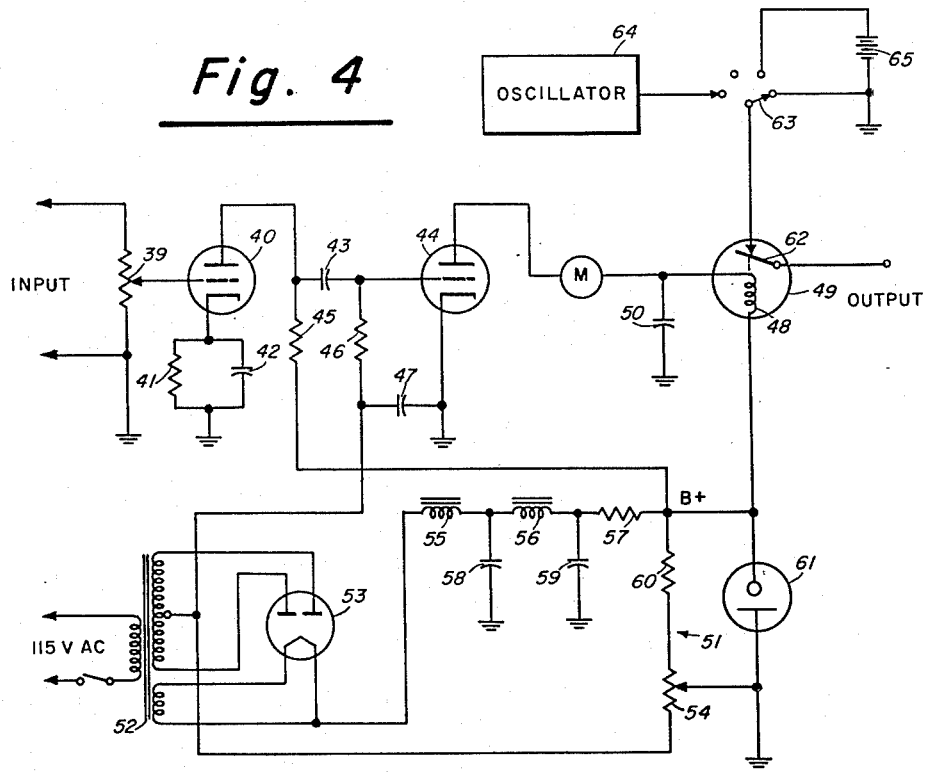
FIG. 4 is a detailed exemplary circuit diagram of a keying circuit that may be employed in the embodiments of FIGS. 2 and 3.

Referring now to FIG. 4, there is shown an exemplary circuit of a keying circuit which may be appropriately incorporated as the keying circuits of the above mentioned FIGS. 2 and 3. The input thereto is applied across the resistance of a potentiometer 39 with one terminal thereof grounded. The slide member of said potentiometer is connected to the grid of an amplifier tube 40. The cathode of amplifier 40 is coupled to ground through parallel connected resistor 41 and capacitor 42, and the plate thereof is connected through a coupling capacitor 43 to the grid of a second stage amplifier tube 44. The plate of amplifier 40 is coupled to B+ voltage through a plate resistor 45. The grid of amplifier 44 is coupled through series connected resistor 46 and capacitor 47 to ground, the cathode of amplifier 44 is likewise connected to ground, and the plate thereof is coupled through a current measuring meter M to one terminal of solenoid 48 of a normally closed relay 49. A voltage stabilization capacitor 50 is connected between the interconnection of meter M and solenoid 48 and ground. The other terminal of solenoid 48 is coupled to the B+ voltage of a regulated power supply 51.

Power supply 51 includes a transformer 52 adapted to be energized, for instance, by a 115 volt alternating current at the primary winding thereof. Said transformer contains a pair of secondary windings, one of which is connected across the filament of a dual-diode tube 53, and the other of which is center-tapped and connected to the plates of said tube. Said center tap is connected to the junction of the aforesaid series connected resistor 46 and capacitor 47 and to one terminal of the resistance of a variable load adjustment potentiometer 54. The filament of tube 53 is the output thereof and is connected through a pair of smoothing chokes 55 and 56 and a resistor 57 connected in series. Filter capacitors 58 and 59 are respectively connected between the junction of chokes 55 and 56 and choke 56 and resistor 57 and ground. The output terminal of resistor 57 is, of course, the B+ voltage supply terminal and is coupled through bleeder resistor 60 to the other terminal of the resistance portion of potentiometer 54. The slider member of potentiometer 54 is connected to ground. A voltage regulating tube 61 interconnects the aforesaid B+ terminal and ground.

Relay 49 also includes electrical contacts 62, one of which acts as the output for the entire keying circuit and the other of which is connected to the movable arm of a switch 63. In the subject preferred embodiment said switch contains four contact points, each of which is respectively coupled to the output of an oscillator 64, to an open circuit, to positive terminal of a D.C. voltage supply 65, and to ground. The negative terminal of said D.C. voltage supply 65 is likewise coupled to ground.

Briefly, the operation of this invention is as follows:

The transmitter portion of the actual operation sonar broadcasts its ping or CW signal, and, as is conventional to prevent damage and unwanted signals from arriving at the receiver portion during transmission, the receiver portion is turned off. As soon as the transmission is over, the receiver is then conventionally turned on again to enable reception of any CW signal reflected by a target. Thus, it can readily be seen that, as far as the sonar receiver is concerned, there is a silent or blank time which occurs during CW transmission, and at all other times ordinary reception may occur. It has been found that this blank time provides an excellent opportunity to trigger or otherwise actuate pertinent training readout equipment which may be operated at some time subsequent to the actual sonar search operations and perhaps at a location remote therefrom as well. Accordingly, actual operating conditions may be simulated at a time and place more suitable for the training of operators or at a place where evaluation of the results obtained may be accomplished by a staff of expert evaluators.

An improved method and means for achieving such results is embodied in the device represented by FIG. 2. The magnetic tape containing the tape recording made in the field of actual operations is played back on tape recorder 26. The output therefrom may, for example, be similar to the waveform shown in FIG. 5(a) in that it contains the received sonar intelligence or data signals with blank periods in between. Since these signals are fed to audio monitor 27, an operator, trainee, or evaluator listening thereat would hear a series of intermittent CW signals. These signals are then applied through impedance match 28 to actuate keying circuit 30 which, in turn, timely triggers pulse generator 31 so that a signal of predetermined frequency is generated. Obviously, the particular type of signal generated by pulse generator 31 depends on the type of signal required to ultimately trigger the utilization, training, and readout equipment. In many instances, it has been found that a seventy-five cycle per second signal provides very satisfactory operation, and, hence, it was employed in many of the experimental and prototype devices constructed to date. Of course, the type of pulse generator used determines the type of input signal required to actuate same. For example, it may be energized by having its input grounded as shown in FIG. 5(b), or ungrounded, or an oscillator signal may be used to energize it, or perhaps a particular positive potential may be required and used for energization thereof, as will be further mentioned below in connection with the discussion of FIG. 4.

Figure 5:
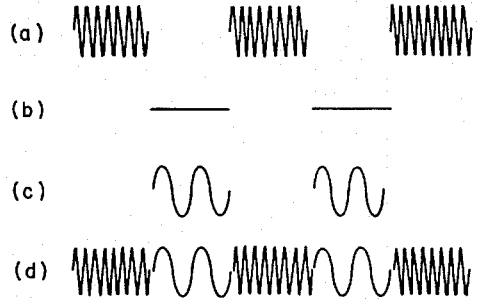
FIG. 5 is a graphical representation of exemplary signal waveforms that may be associated with the various components of the device of FIG. 2.

The output signal from pulse generator 31 is exemplified by the waveform of FIG. 5(c), and this is the signal which triggers the utilization, readout, and training equipment, as previously mentioned. In order to insure accuracy of timing thereof, said trigger signal may be filtered as necessary by filter 32. However, as previously stated, in event purity of frequency of the triggering frequency is not necessary for proper operation of the training equipment, filter 32 may be deleted from the subject system without violating the inventive concept of the subject invention herein disclosed.

Whether or not it is filtered, said trigger signal from pulse generator 31 is applied to utilization readout 33 and tape recorder 34 through impedance match 29. Of course, the received sonar intelligence CW signals or the like are likewise fed to utilization readout 33 and tape recorder 34 through impedance match 29. Because the pulse generator output signal is produced during the sonar receiver silent time (which is also the sonar transmitting time), it is timely inserted between the received sonar intelligence signals, as indicated in an exemplary fashion in the waveform of FIG. 5(d). Thus, it can readily be seen that the trigger signals and the intelligence signals are alternately associated, enabling the former to be used for triggering the sweep in the training display or readout device and thereby display the latter in synchronism with the original sonar signals recorded during actual field operations. Not only does this enable subsequent use of the original data at any desired time, higher fidelity of operational simulation is effected as a result of the synchronization and correlation provided by the subject system.

Inasmuch as another recording of the combined sonar intelligence and synchronization signals is made by magnetic tape recorder 34, a permanent and portable record becomes available which greatly facilitates training and data evaluation procedures.

The device of FIG. 3 functions in a manner substantially similar to that of FIG. 2 with the exception of using keying circuit 36 to directly trigger range recorder scope 37 or any other utilization and readout equipment without benefit of the cleanness of operation and additional trigger signal accuracy provided by the inclusion of a pulse generator and filter.

Of paramount importance in this invention is the incorporation of the keying circuit therein which enables the aforementioned silent or blank time to be utilized to an advantage for synchronization purposes. FIG. 4 illustrates an example of the type of keying circuit that may be used. Essentially it comprises normally closed relay 49 whose contacts are opened by the presence of a received sonar intelligence signal of the type exemplified by FIG. 6(a). In order to properly actuate said relay, however, it has been found to be preferable to control the amplitude of said input signals, then amplify them in a plurality of amplifiers to whatever power is necessary to energize solenoid portion 48. Solenoid current may be measured and indicated by meter M and regulated accordingly by potentiometer 39. Power is available from the power supply portion of the circuit and, if so desired, the bias voltage thereof may be regulated by potentiometer 54.

Figure 6:
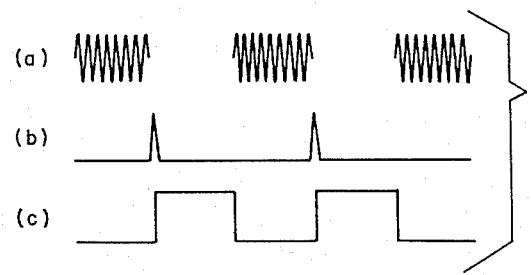
FIG. 6 is a graphical representation of exemplary signal waveforms that may be associated with the various components of the device of FIG. 3.

As FIG. 4 illustrates, various and sundry exemplary signal generating sources may be employed in conjunction with the operation of relay 49, contingent on the position of the arm of selector switch 63. For instance, oscillator 64 may provide pips as shown in FIG. 6(b), or battery 65 may provide a positive potential as shown in FIG. 6(c), or a ground or open circuit may be provided merely by appropriate selection of the respective switch contacts. Thus, depending on whether relay contacts 62 are closed or open which, in turn, are respectively contingent on the absence or presence of sonar intelligence signals being applied to the input of the subject keying circuit, the aforementioned outputs are produced as desired thereby.

Although each of the individual components of the systems constituting this invention are conventional per se, when they are combined as herein disclosed, they form a valuable synchronization link between field sonar equipment and training or other utilization equipment.

Although the subject disclosure has been primarily concerned with structures associated with sonar operations and equipment, it should be understood that the inventive principle and devices embody same are equally applicable to radar or any other type of echo-ranging systems, and that so using is considered to be well within the spirit and purview of the present invention.

Obviously, many modifications and variations of the present invention are possible in the light of the above teachings. It is therefore to be understood that within the scope of the appended claims, the invention may be practiced otherwise than as specifically described.

What is claimed is:

1. A synchronized sonar trainer consisting of a tape recorder adapted for reproducing intermittently received signals recorded on a magnetic tape, keying means coupled to said tape recorder for producing a synchronizing signal in response to the cessation of reception of each of said intermittently received signals, and means for recording and reading out a substantially continuous signal containing said intermittently received signals with said synchronizing signal alternately disposed therebetween.

2. A synchronized trainer system comprising in combination, a recorder means adapted for reproducing prior recorded intermittent signals as the output therefrom, and audio monitor means coupled to the output of said recorder means, a keying means effectively connected to the output of said recording means, said keying means being adapted for producing an output signal of predetermined frequency during the period between said reproduced intermittent signals, and means effectively connected to said recorder means and the aforesaid keying means for displaying the intermittent signal and predetermined frequency outputs therefrom alternately and continuously as a unitary output signal.

3. The device of claim 2 wherein said keying means effectively connected to the output of said recording means includes a relay having a solenoid and a pair of normally closed electrical contacts, means coupled to said solenoid for opening said contacts during reception of the signal portions of said reproduced intermittent signals, and means connected to one of said pair of electrical contacts for generating a predetermined output trigger signal.

4. The device of claim 3 wherein said means connected to one of said pair of electrical contacts for generating a predetermined output trigger signal consists of a selector switch having a movable arm and a plurality of contacts engageable therewith, an oscillator connected to one of said plurality of contacts, an open circuit coupled to another of said plurality of contacts, a ground connected to still another of said plurality of contacts, and means coupled to a final contact of said plurality of contacts for providing a positive potential thereat.

5. A synchronized sonar trainer comprising in combination, means for reproducing previously received and recorded echo-ranging signals, means connected to said reproducing means for producing a predetermined synchronizing signal in response to and during the silent period between said received echo-ranging signals, and means connected to said signal producing means for timely utilizing, recording, and reading out said received echo-ranging signals in response to the aforesaid synchronizing signal.

6. The device of claim 5 wherein said means for reproducing previously received and recorded echo-ranging signals is a magnetic tape recorder adapted for recording echo-ranging signals on a magnetic tape, storing said recorded echo-ranging signals for a predetermined period of time, and playing back said stored echo-ranging signals as desired.

7. The device of claim 5 wherein said means connected to said reproducing means for producing a predetermined synchronizating signal in response to and during the silent period between said received echo-ranging signals includes a keying circuit.

8. The device of claim 5 wherein said means connected to said reproducing means for producing a predetermined synchronizing signal in response to and during the silent period between said received echo-ranging signals includes a keying circuit and a pulse generator coupled to the output thereof.

9. The device of claim 5 wherein said means connected to said signal producing means for timely utilizing, recording, and reading out said received echo-ranging signals in response to the aforesaid synchronizing signal includes a range recorder scope.

10. A synchronized sonar trainer system comprising in combination, a first magnetic tape recorder, a first impedance match connected to the output of said first tape recorder, a keying circuit coupled to the output of said impedance match, a pulse generator coupled to the output of said keying circuit, a filter connected to the output of said pulse generator, a second impedance match interconnecting the outputs of said filter and the aforesaid first impedance match, a readout coupled to the output of said second impedance match, a second tape recorder connected to the output of said second impedance match, and an audio monitor connected to the output of the aforementioned first tape recorder.

11. A synchronized sonar trainer system comprising in combination, means for reproducing a plurality of intermittently received and previously recorded sonar signals, means coupled to said reproducing means for making said sonar signals audible, means for producing a trigger signal in response to the cessation of reception of each of said intermittently received signals, means coupled to said last mentioned means for generating a predetermined synchronizing signal in response to said trigger signal, means for utilizing, reading out, and tape recording said plurality of intermittently received sonar signals and said predetermined synchronizing signal, and means connected to said reproducing means, said trigger producing means, said predetermined synchronizing signal generating means, and the aforesaid utilizing, readout, and tape recording means for effectively applying said plurality of intermittently received sonar signals and said predetermined synchronizing signal thereto, respectively, as a substantially continuous unitary signal.

12. A method of producing a sonar training and evaluation tape comprising the steps of recording sonar CW signals received during echo-ranging search operations, generating a synchronizing signal during the period between each of said received CW signals, alternately recording said CW signals and said synchronizing signal on a magnetic tape as a single continuous signal.

References Cited in the file of this patent
UNITED STATES PATENTS

| | | |
|---|---|---|
| 2,824,387 | Harwood | Feb. 25, 1958 |
| 2,861,255 | Mechler et al. | Nov. 18, 1958 |
| 2,863,227 | Chubb et al. | Dec. 9, 1958 |
| 2,869,251 | Chubb | Jan. 20, 1959 |